Jan. 2, 1962 J. W. AYERS ETAL 3,015,627
GAMMA FERRIC OXIDE FOR MAGNETIC IMPULSE RECORD MEMBERS
Original Filed April 5, 1955
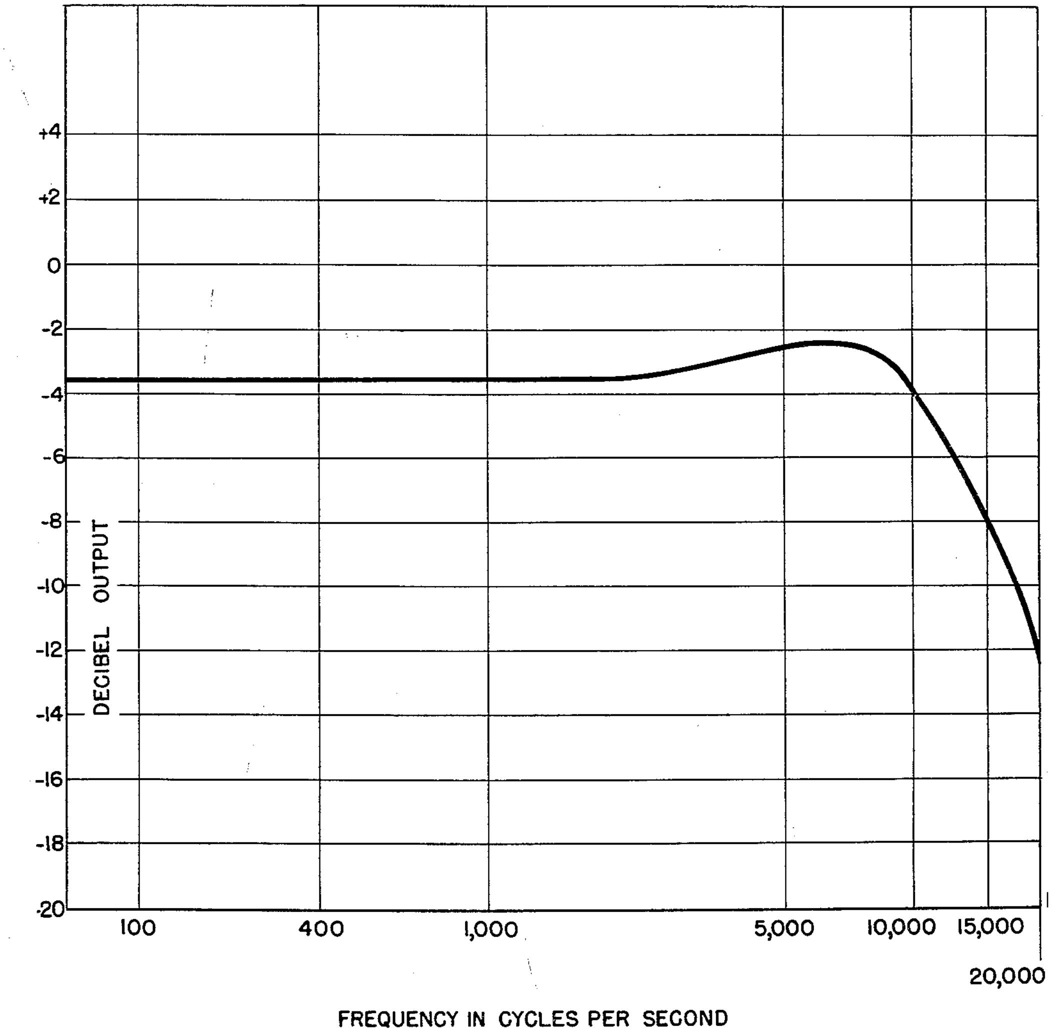
INVENTORS
JOSEPH W. AYERS
ROBERT A. STEPHENS
BY
Pollard, Johnston, Smythe & Robertson
ATTORNEYS

United States Patent Office 3,015,627

Patented Jan. 2, 1962

3,015,627

GAMMA FERRIC OXIDE FOR MAGNETIC IMPULSE RECORD MEMBERS

Joseph W. Ayers and Robert A. Stephens, Easton, Pa., assignors to C. K. Williams & Co., East St. Louis, Ill., a corporation of Delaware Continuation of application Ser. No. 840,199, Sept. 15, 1959, which is a continuation of application Ser. No. 499,260, Apr. 5, 1955. This application July 6, 1960, Ser. No. 41,209

13 Claims. (Cl. 252—62.5)

This invention relates to improvements in magnetic impulse record members in the form of tapes, bands, discs, sheets, cylinders, moving picture films, electronic computer components and telemetering equipment. These records members are composed of finely divided magnetic iron oxide material of a specific type bonded together in a suitable bonding medium. In a most important embodiment, the invention provides a magnetic impulse recording tape composed of a non-magnetic backing or carrier such as paper or plastic having thereon adherent coating of a binding resin containing a magnetic oxide layer of novel physical characteristics.

Prior to the advent of the present invention and over a period of several years, the assignees of the instant application with the assistance of the present applicants have been engaged in the extensive manufacture of magnetic iron oxides used in the fabrication of sound recording tapes and other magnetic impulse recording members. The iron oxide material employed has been composed essentially of either ferroso-ferric oxide or gamma ferric oxide, in the form of fine acicular or needle-like particles derived from synthetically prepared, non-magnetic crystalline particles of alpha-ferric oxide monohydrate either by reduction alone, or by reduction followed by mild oxidation, respectively.

Although the recording members containing these oxides have performed satisfactorily in many respects, the members are lacking in several qualities which contribute to their unsatisfactory or limited performance in several fields.

A primary object is to produce magnetic impulse recording members possessing the good qualities of high coercive force, high remanence and other desirable properties of the oxides now on the market and also possessing greater maximum performance in terms of output due to the greater magnetic induction that can be induced in the medium per unit of volume.

The prior recording members having a coating of the acicular iron oxide particles show a precipitous drop-off in signal output at high frequencies in the range of ten thousand cycles and above. Another object of the present invention is to provide recording members which do not show this weakness, thus avoiding the necessity for the use of compensating electronic circuits in attempts to overcome this weakness.

Another object is to provide magnetic impulse record members especially suitable for recording and reproducing television and video programs where very high frequencies are employed.

The invention may be broadly defined as encompassing magnetic impulse record members comprising a binding medium having therein a gamma ferric oxide in the form of very fine-grained crystalline plates having a length to width ratio of more than 1 to 1 and a width to thickness ratio of at least 3 to 1, which oxide is derived from synthetic gamma ferric oxide monohydrate particles of corresponding dimensions by reduction and oxidation imparting the desired magnetic properties.

The novel, improved properties of the record members of the invention as compared with the already known members hereinbefore described are attributed to the use of the synthetic gamma ferric oxide monohydrate particles (a ferro-magnetic material) of novel dimensions in the production of magnetic oxide. The magnetic oxide itself produced from these particles possesses a degree of superiority as to the desired magnetic properties but its performance characteristics when incorporated in magnetic impulse record members, surprisingly, is much superior to any quality expected.

Practically considered, the record members provide uniform signal output at frequencies over an extended range or up to 11,000 cycles and more per second, and furthermore have a utilizable signal output over the whole frequency range up to 20,000 cycles, such being particularly important when the member is used for purposes such as video program recording.

In the accompanying drawing, the FIGURE is a graph which illustrates the output in decibels of a typical oxide of the invention at various frequencies, on semi-logarithmic scale.

The starting material for the production of the recording members of the invention may be described more exactly as synthetic, finely divided magnetic gamma ferric oxide monohydrate plate-like crystalline particles having a length of five or less microns and a length to width ratio of more than 1 to 1 and a width to thickness ratio of at least 3 to 1. Typically these gamma ferric oxide monohydrates have a high coercivity and low remanence. For example, the coercive force will normally range from 250–300 oersteds and remanence from 5 to 20 gauss, as determined by symmetrical cyclical magnetization of the material to a maximum applied magnetic field strength or $H_m$ value of 1000 oersteds. Better performance is obtained from recording members when the particles used in the process have a length to width ratio of at least 5 to 1 and best performance when at about 10 to 1. As to the width to thickness ratio, 5 to 1 gives better results. The particles of the indicated thickness are so thin that they are transparent when viewed under the microscope under lighting conditions showing acicular particles made from alpha ferric oxide monohydrate to be opaque.

This very flat shape of the original particles and their relative dimensions are carried through to the ferromagnetic iron oxide particles on or in the record members and apparently contribute to the superior magnetic qualities revealed. Although the importance of a certain length to width ratio in acicular or needle-like particles wherein the *a* and *b* axes of the particles are the same or substantially the same has heretofore been recognized, the effect of the ratio of length and width to thickness has not heretofore been considered or at least its importance ascertained. The much diminished third dimension of the plate-like ferromagnetic iron oxide particles imparted through the initial use of the ferromagnetic gamma ferric oxide monohydrate particles constitutes a feature of the invention when resolved in terms of the improved magnetic properties of magnetic impulse recording media containing the same.

The mass of the very fine crystalline gamma ferric oxide monohydrate used in the production of the gamma ferric oxide can be prepared advantageously in a two step process, the first involving the preparation of a seeding material and the second the production of the oxide particles by growing the same under controlled conditions upon the seeding material.

Sixty-three pounds of ferrous chloride are introduced into an agitating tank and sufficient water is introduced to bring the volume to 350 gallons. The temperature of the solution is raised to 80° F. and thereupon a dilute solution of sodium hydroxide is introduced into the tank over a five minute period, during agitation of its contents. The amount of sodium hydroxide introduced is 28 pounds and its concentration may be varied from one-half to one pound per gallon. Air is bubbled through the resulting mass at the rate of 20 c.f.m. for a period of about one hour during which oxidation of the ferrous precipitate continues, causing the color to change from a dark blue into a green and finally into a brownish yellow. When the color has changed to yellowish tan, the air flow rate is reduced to about 10 c.f.m. and its introduction into the slurry is continued for an additional hour or somewhat more, at which time the production of the seeding material is complete.

This seeding material and 220 pounds of ferrous chloride at about two pounds per gallon concentration together with 35 pounds of zinc chloride at a concentration of about 3 pounds per gallon are introduced into a reactor containing scrap iron in substantial excess of the amount which will be reacted. Sufficient water is then added to bring the operating level to about 1250 gallons. Thereupon the contents of the reactor are agitated and oxidized by the introduction of a stream of air of about 80 c.f.m. The temperature of the mass in the reactor is increased to about 140° F. and maintained at this level during the oxidation which takes from about 24 to 48 hours.

At this point, the contents are removed and washed free of soluble salts, using decantation or filtration. The washed oxide is finally filtered and dried by conventional procedures. The product obtained is composed of plate-like crystalline particles of substantially uniform size of about one micron and less in length, the ratio of length to width being about 10 and more to 1 and the apparent ratio of width to thickness being at least 4 to 1, the plates appearing to be transparent.

Other methods of producing suitable gamma ferric oxide monohydrate particles are known and described in the literature and may be used in place of the above described process, the only requirement being that the conditions of production be adjusted and controlled such that particles of required size and dimensions are obtained. In general, iron salts other than ferrous chloride may be used as the starting material, such as ferrous sulfate. Also other alkalis may be used in the place of sodium hydroxide such as ammonium hydroxide. Pyridine or aniline may be used as the alkaline reacting agents. Retarding agents appear to be highly advantageous in preventing the seeding material from changing to the goethite or needle-like particle form, examples of retarding agents being zinc chloride (as already disclosed), zinc sulfate, sodium chloride and ammonium chloride.

The gamma ferric oxide monohydrate particles of the required size and dimensions are then converted to ferroso-ferric oxide by the action of hydrogen at a high temperature under conditions which change the orthorhombic crystal structure into a spinel crystal structure, and thence the ferroso-ferric oxide is converted to gamma ferric oxide by oxidation under conditions which retain the spinel crystal structure. Several procedures for accomplishing these conversions are known and described in the literature. Suitable reduction and oxidation techniques are disclosed, for example, in U.S. Bureau of Mines Bulletin No. 425 (1941). The conversion may be accomplished in the following way:

The dried mass of the gamma monohydrate particles prepared as specifically outlined herein is pulverized by a mild grinding operation to break up the clusters, and then, to accomplish the reduction, the mass of fine particles is fed into a rotary kiln and heated, while the indicator-controller temperature registers from 600° to 1000° C. Hydrogen is introduced into the kiln tube in known manner, thereby to provide a ferroso-ferric oxide product having a ferrous iron content of approximately 23%. The reduced particles are discharged from the kiln tube through a water-cooled screw conveyor.

For conversion of this ferroso-ferric oxide to gamma ferric oxide, the former is again passed through the same or a similar rotary kiln. In this operation the oxide is continuously passed through the kiln tube and again heated. Over the charge half of the tube, the temperature is maintained between about 345° and 445° F. and over the discharge end of the tube, at about 445° to 545° F. During the passage through the kiln the oxide is subjected to the action of approximately 2.9 cubic feet of air for each part of the ferroso-ferric oxide introduced into the kiln. The oxidized material is passed from the kiln through a water-cooled, screw discharge tube.

The gamma ferric oxide thereby obtained as a coercive force of 325–375 oersteds and a remanence of about 1800 gauss, after being subjected to a magnetic field strength of 1000 oersteds. By variations in conditions the coercivity can be varied between 200 and 450, and the retentivity between 1200 and 2500, and operable magnetic record members can be produced therefrom.

A magnetic tape containing the gamma ferric oxide thus obtained was produced by the following procedure.

The ingredients set out in the table below, in parts by weight, are mixed and introduced into a ball mill.

| | |
|---|---|
| Gamma ferric oxide, $Fe_2O_3$ | 840 |
| Methyl abietate-maleic glycol ester | 60 |
| Vinyl resin (13% vinyl acetate—87% vinyl chloride copolymer) | 120 |
| A plasticizer (a linear high molecular weight polyester resin prepared by the reaction of a dibasic acid with a dihydric aliphatic alcohol) | 60 |
| Methyl isobutyl ketone | 500 |
| Toluol | 300 |

This mixture is ground for twenty hours or longer yielding a product of Hegman Fineness of 6.5 and a viscosity of approximately 83 Krebs Units. The mass is then mixed with an additional 200 parts of toluol and applied in accordance with known practice to a cellulose acetate base in the form of an 8–12 inch wide strip. While the applied coating is still wet, it is run through a magnetic field to orient the particles in known manner after which the strip is dried, calendered, compressed and burnished and finally it is slit and put on rolls or reels under tension, the normal film thicknesses being from about 0.30 to 0.60 mil, and in this specific instance, being 0.55 mil.

Using a magnetic tape testing machine and all necessary auxiliary equipment for evaluating tapes, the new tape of the present invention was carefully tested and compared with a sample of the highest grade general purpose tape sold for commercial use (of the same 0.55 mil thickness) which had all-round satisfactory performance characteristics, this tape being referred to as "Standard." The new tape and the Standard tape were compared as to their frequency response including flatness of response, magnitude of response and uniformity of response; also as to their signal to noise ratio, their signal to direct current noise ratio, and their saturated signal to noise ratio, and also their peak bias. The new tape was outstanding in flatness of response over a wide range of frequency and in signal to noise ratio at high frequencies and compared favorably with the Standard tape in all other tests.

The comparative frequency response is brought out in the following table:

*Frequency response test results*

| Frequency in Cycles per Sec | 100 | 400 | 1,000 | 5,000 | 10,000 | 15,000 |
|---|---|---|---|---|---|---|
| Decibel Output of: | | | | | | |
| New Gamma Ferric Oxide | −2.5 | −2.5 | −2.5 | −1.6 | −3.5 | −7.5 |
| Standard Gamma Ferric Oxide | −3.5 | −3.5 | −3.8 | −6.0 | −10.5 | −19.0 |

The frequency response of the tape of the present invention is also recorded in the accompanying drawing on semi-logarithmic graph paper. With reference to the drawing and as well to the table it will be observed that the signal output of the new magnetic tape is substantially uniform at frequencies up to more than 11,000 cycles per second and that the tape has a utilizable output over the whole frequency range up to about 20,000 cycles per second. (Deviation of plus or minus about one decibel is inconsequential in practical operation.) From the table it will also be observed that the signal output of the Standard begins to drop at 1000 cycles and falls off more rapidly at 5000 cycles.

The advantages of the magnetic impulse record members of the present invention may be summarized as follows:

(*a*) The signal output of the members is considerably greater at high frequencies than that of the present commercially used members when employed in identically the same way in the same type of medium hvaing equal film same way in the same type of medium having equal film thickness.

(*b*) The members have adequate signal output at desirable high frequency levels of ten kilocycles and above. This quality makes the record members especially effective where high fidelity audible response is needed, and also particularly where only high frequencies are recorded as in video reproduction.

(*c*) Because of the greater output and other qualities, the record members of the invention in the form of magnetic tapes may be operated at a slower speed particularly in the recording of video programs. For this reason there is less wear on the recording, play-back, and erasing heads of the recording apparatus and there is less wow, flutter and distortion created by the mechanical movements of the tapes.

(*d*) The particles of the magnetic iron oxide used in the production of the record members of the invention are free of objectionable aggregation, are easily dispersed in the bonding medium in which they are suspended and respond readily to orientation. These qualties increase the magnetic capacity of the record member, thus increasing its output. The thin plate-like shape of the particles of the magnetic oxides greatly lessens the voids present in the medium and accordingly the magnetic capacity of the member is materially improved over the performance of members containing acicular particles. Greater packing density and greater magnetic induction apparently result from the lamination and foliation of the thin plate-like particles of the magnetic oxides used.

(*e*) The frequency response of the magnetic oxide in the magnetic impulse record members of the invention is sufficiently uniform throughout the entire frequency range that for most purposes the necessity for providing very elaborate compensating electronic components for adjusting electronic circuits to correct the magnetic impulse output to overcome irregularities at different positions in the sound spectrum is lessened if not avoided.

(*f*) The rceord members of the invention can be used in some instances where those made with conventional oxides cannot, as where the internal noise of the circuit in which the members are to be used is equal to or higher than the intensity of the signal induced into the electronic circuit. Since the output of the standard and other prior members drops off at 10,000 cycles, the signal may wash out completely at 15,000 cycles, particularly at slow tape speeds. At frequencies between these figures, the energy output may be so small that it is below the noise level of the apparatus, and in this case, the record member is worthless. In contrast thereto, the impulse record members of the present invention show higher output at high frequencies at least as high as 20,000 cycles per second, and this means that the record members have a wider range of adaptability and a greater utility.

(*g*) Magnetic tapes can be produced having thinner coatings of oxide, this quality being of substantial importance in the recording of video programs where linear speeds of from 100 to 200 inches per second are important. Hence the problem of handling large reels of tape is reduced. Thin coatings are desirable for economic reasons, lesser quantities of raw materials are required—thus they cost less.

(*h*) They are superior to known members because of low distortion and low noise levels, for the particles of flat or plate-like shape are substantially more uniform in size and they are substantially free from large oversize particles. The flat character of the particles makes it possible to provide a more even and regular surface upon the magnetic impulse record members. Since the induced signal on the members at high frequencies is a skin or surface effect and the surfaces of the members are very smooth, there is less distortion of the impulses and signals. Because of an improvement in the packing arrangement of the plate-like particles in the binding medium, layers of the same thickness can be provided having greater output.

As to other qualities required or desirable for successful performance, the record members of the invention are comparable to those containing acicular particles now in commercial use. The particles of the magnetic oxide of this invention in or on record members are of optimum small size to provide most effective coercive force and remanence. The length-breadth ratio of these plate-like particles is such that high magnetic induction is obtained. The coercive force of these magnetic oxides is sufficiently low under working conditions of magnetic recording processes that induced magnetic signals thereon may be satisfactorily erased.

This application is a continuation of our application Serial No. 840,199 filed September 15, 1959, which in turn is a continuation of our application Serial No. 499,260 filed April 5, 1955, both now abandoned.

It should be understood that the present invention is not limited to the specific details disclosed herein except in the respects herein set forth, for it includes variations which will occur to those skilled in the art upon consideration of the general teachings of the invention and the scope of the claims appended hereto.

We claim:

1. A magnetic impulse record member having a substantially uniform signal output at frequencies up to at least about 11,000 cycles per second comprising, a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of more than 1 to 1 and a width to thickness ratio of at least 3 to 1.

2. A magnetic impulse record member comprising, a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of more than 1 to 1 and a width to thickness ratio of at least 4 to 1 and having a coercivity of from about 200 to 450 oersteds and a retentivity of from about 1200 to 2500 gauss.

3. A magnetic impulse record member comprising, a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of at least 5 to 1 and a width to thickness ratio of at least 3 to 1.

4. A magnetic impulse record member having a utilizable signal output over the whole frequency range up to 20,000 cycles per second comprising, a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of at least 5 to 1 and a width to thickness ratio of at least 3 to 1.

5. A magnetic impulse record member having a utilizable signal output over the whole frequency range up to 20,000 cycles per second comprising, a non-magnetic strip having thereon an attached track containing a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of more than 5 to 1 and a width to thickness ratio of at least 3 to 1 and having a coercivity of from about 200 to 450 oersteds and a retentivity of from about 1200 to 2500 gauss.

6. A magnetic impulse record member for video and other high frequency transcriptions having a high signal to noise ratio and an effective signal output at frequencies in the range of 5000 to 20,000 cycles per second comprising a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, flat, crystalline particles having a length of not more than five microns, also having a length to width ratio of at least 5 to 1 and a width to thickness ratio of at least 3 to 1.

7. A magnetic impulse record member having a utilizable signal output over the whole frequency range up to 20,000 cycles per second comprising, a binding medium having therein a synthetic gamma ferric oxide, $Fe_2O_3$, formed from a synthetic magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of at least 5 to 1 and a width to thickness ratio of at least 3 to 1.

8. A magnetic impulse record member having a substantially uniform signal output at frequencies up to at least 11,000 cycles per second comprising, a non-magnetic strip having thereon an attached track containing a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of at least 5 to 1 and a width to thickness ratio of at least 4 to 1 and having a coercivity of from about 200 to 450 oersteds and a retentivity of from about 1200 to 2500 gauss.

9. A magnetic impulse record member having a substantially uniform signal output at frequencies up to at least 11,000 cycles per second comprising, a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of more than 5 to 1 and a width to thickness ratio of at least 3 to 1.

10. A magnetic impulse record member having a substantially uniform signal output at frequencies up to at least about 11,000 cycles per second comprising, a binding medium having therein a synthetic gamma ferric oxide, $Fe_2O_3$, produced from a synthetic, magnetic gamma ferric oxide monohydrate by reduction and oxidation of said monohydrate, said ferric oxide, $Fe_2O_3$, consisting essentially of very fine-grained, plate-like crystalline particles having a length of not more than five microns, also having a length to width ratio of 10 to 1.

11. A magnetic impulse record member having a substantially uniform signal output at frequencies up to at least about 11,000 cycles per second and having a utilizable signal output over the whole frequency range up to 20,000 cycles per second comprising, a binding medium having therein a synthetic gamma ferric oxide $Fe_2O_3$, formed from a synthetic, magnetic gamma ferric oxide monohydrate and said ferric oxide, $Fe_2O_3$, consisting essentially of very fine-grained, plate-like crystalline particles having a length of not more than five microns, also having a length to width ratio of more than 1 to 1, and having a coercivity of from about 200 to 450 oersteds and a retentivity of from about 1200 to 2500 gauss.

12. A synthetic gamma ferric oxide, $Fe_2O_3$, formed from a synthetic, magnetic gamma ferric oxide monohydrate and consisting essentially of very fine-grained crystalline particles of flat, plate-like shape having a length of not more than five microns, also having a length to width ratio of more than 1 to 1 and a width to thickness ratio of at least 3 to 1, said particles having a coercivity of from about 200 to 450 oersteds and a retentivity of from about 1200 to 2500 gauss, said particles when fabricated into a magnetic impulse tape providing a substantially uniform signal output up to about 11,000 cycles per second and a utilizable signal output over the whole frequency range up to about 20,000 cycles per second.

13. A magnetic oxide for the production of magnetic impulse record members comprising, a synthetic gamma ferric oxide, $Fe_2O_3$, formed from a synthetic magnetic gamma ferric oxide monohydrate and consisting essentially of very fine-grained crystalline particles of flat, plate-like shape having a length of not more than five microns, also having a length to width ratio of more than 5 to 1 and a width to thickness ration of at least 4 to 1, said particles having a coercivity of from about 200 to 450 oersteds and a retentivity of from about 1200 to 2500 gauss.

References Cited in the file of this patent

UNITED STATES PATENTS

| | | |
|---|---|---|
| 2,560,971 | Martin | July 17, 1951 |
| 2,694,656 | Camras | Nov. 16, 1954 |

FOREIGN PATENTS

| | | |
|---|---|---|
| 675,195 | Great Britain | July 9, 1952 |